Aug. 24, 1948.  E. C. McDANIEL  2,447,659
TRAILER DOLLY
Filed Feb. 28, 1946  2 Sheets-Sheet 1
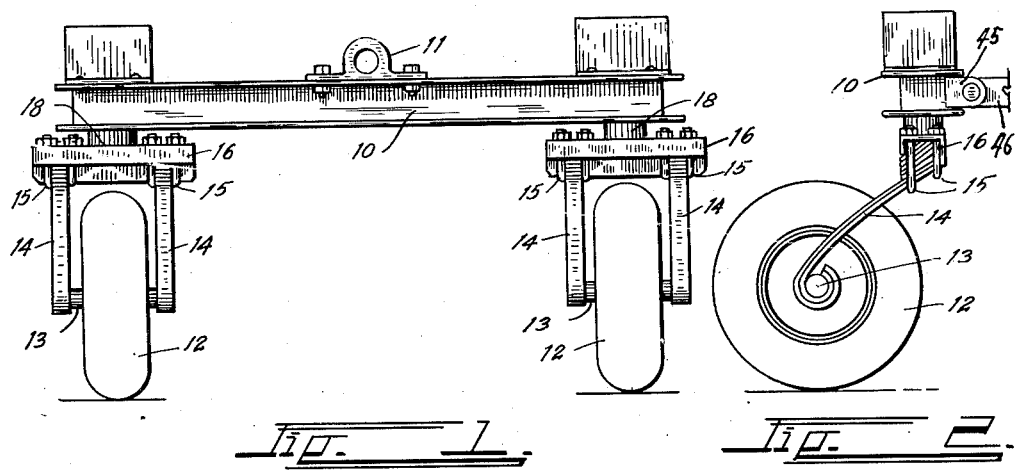
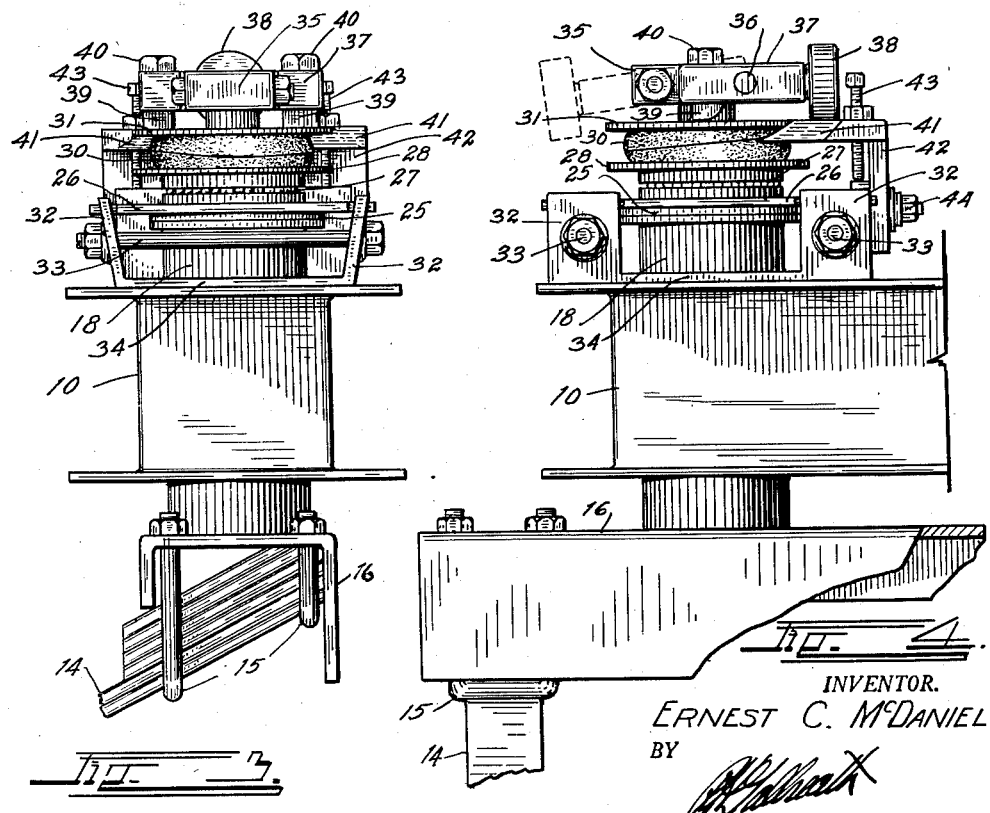
INVENTOR.
ERNEST C. McDANIEL
BY
ATTORNEY.

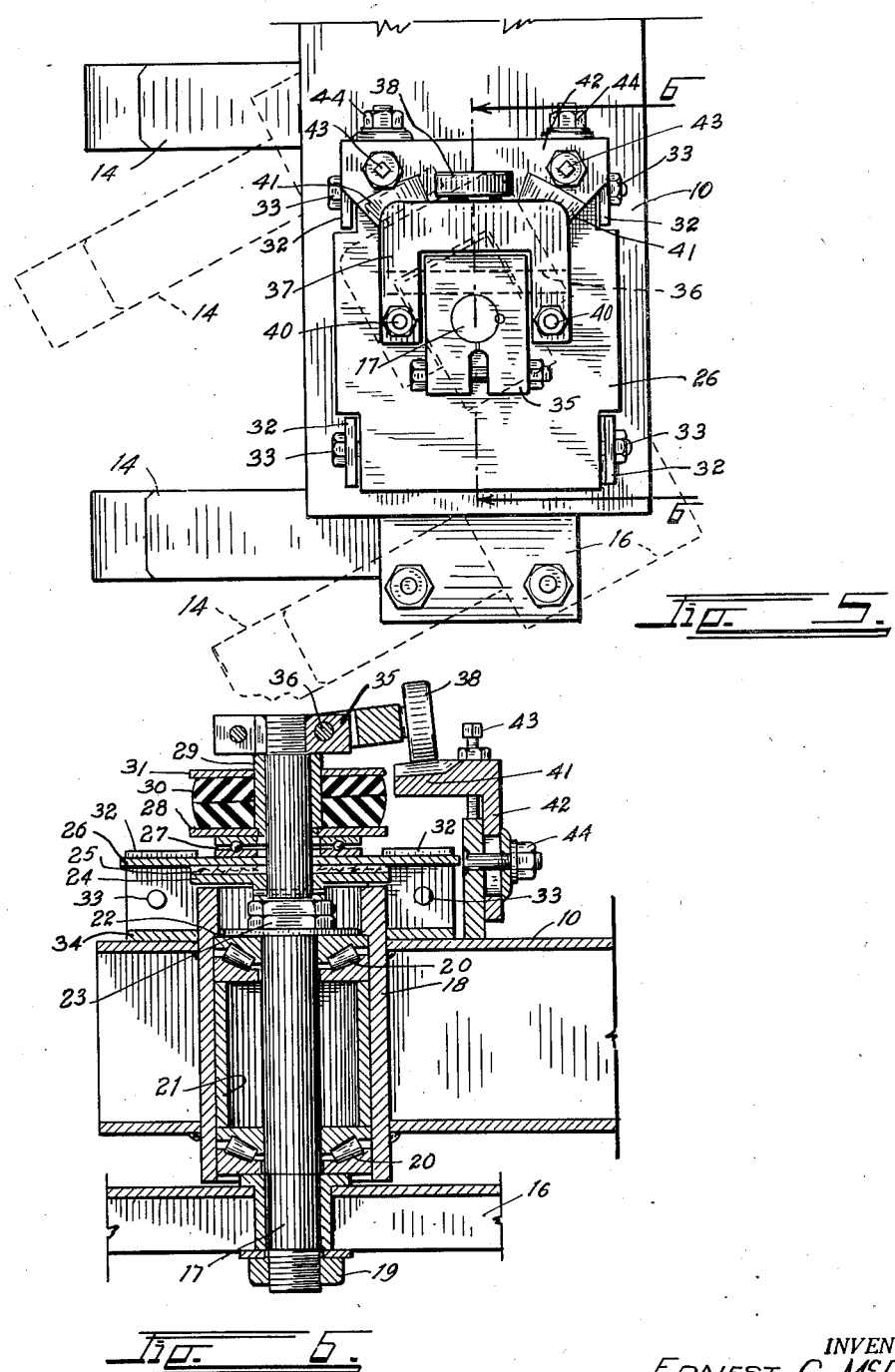

Patented Aug. 24, 1948

2,447,659

UNITED STATES PATENT OFFICE 2,447,659

TRAILER DOLLY

Ernest C. McDaniel, Denver, Colo.

Application February 28, 1946, Serial No. 650,770

5 Claims. (Cl. 280—33.4)

This invention relates to a dolly or front truck for vehicle trailers of the type illustrated in applicant's co-pending application, Serial No. 535,133, now abandoned. The principal object of the invention is to provide a dolly which will accurately and readily follow the towing vehicle; which will not wobble, sway, or "fishtail" at high speeds; and which will have a snubbing action on the caster wheel axis to resist side-swinging or swaying.

A still further object is to so construct the sidesway snubbing device that it will not interfere with backing the trailer, turning corners, or with hand manipulation.

Other objects and advantages reside in the detail construction of the invention, which is designed for simplicity, economy, and efficiency. These will become more apparent from the foling description.

In the following detailed description of the invention, reference is had to the accompanying drawing which forms a part hereof. Like numerals refer to like parts in all views of the drawing and throughout the description.

In the drawing:

Fig. 1 is a rear view of the improved trailer dolly;

Fig. 2 is a side view thereof;

Fig. 3 is an enlarged end view of the dolly, illustrating the wheel snubbing mechanism;

Fig. 4 is a fragmentary front view of the wheel snubbing mechanism;

Fig. 5 is a plan view of the wheel snubbing mechanism; and

Fig. 6 is a vertical section, taken on the line 6—6, Fig. 5.

The improved trailer dolly consists of a transversely extending main frame member 10, preferably built up from structural channel irons, in the shape of an elongated box. A trailer bearing 11 is mounted on top of the frame 10 at its middle for receiving the tongue of a trailer. It is provided on its front face with hinge ears 45 from which a towing tongue member 46 projects as is usual in trailer dolly constructions.

The frame 10 is supported at its extremities on two caster wheels 12. The wheels are mounted on axles 13, each of which is in turn mounted between a pair of cantilever leaf springs 14. Each pair of springs 14 is secured at its forward extremity by means of spring clips 15 to the opposite extremities of a wheel bracket member 16.

A pivot shaft 17 arises from the middle of each of the wheel bracket members 16 and extends axially through a trunnion bearing tube 18, there being one of the tubes 18 secured adjacent each extremity of the frame member 10 extending above and below the latter. The wheel bracket members 16 are secured to the pivot shaft 17 by means of suitable clamping nuts 19.

The shafts 17 extend vertically through roller thrust bearings 20 in the trunnion bearing tube 18 separated by a tubular separator 21. The upper thrust bearing 20 rests against a stop shoulder 22 which carries the load on the dolly. The preload pressure on the bearings 20 is adjusted by means of jam nuts 23.

A brake disc 24 is keyed to the shaft 17 above the trunnion tube 18. A friction disc 25 rests upon the disc 24 and separates it from a rectangular stationary plate 26. A ball thrust bearing 27 rests on the stationary plate 26 and supports a pressure plate 28. The pressure plate is mounted on a hub sleeve 29 which is freely rotatable about the shaft 17. A compressible cushion member 30 of rubber or similar material is placed upon the pressure plate 18 beneath an upper pressure plate 31.

The stationary plate 26 is prevented from rotating by means of two pair of ears 32, each pair being tied together by means of a tie bolt 33. The ears are turned upwardly from a base plate 34 which is secured to and rests on the frame 10.

The upper extremity of the shaft 17 terminates in a lug 35 which is threaded thereon and which may be locked against rotation by keying or welding. The lug 35 carries a hinge pin 36 upon which a bifurcated yoke 37 is mounted. The yoke carries an actuating roller 38 at its one extremity. The furcations of the yoke carry cam members 39 secured thereto by attachment nuts 40. The cam members rest in contact with the upper pressure plate 31.

The roller 38 is positioned to contact a cam track member 41 which is designed with a high point at its middle and low points at the opposite sides thereof. The cam track member 41 is carried on an adjustable bracket 42, the heighth of which can be adjusted by means of an adjusting screw 43 and which can be locked in place by means of a lock nut 44.

When the dolly is being pulled straight ahead and the wheels 12 are trailing straight behind, the roller 38 is resting on the high point of the cam track 41 as shown in Fig. 6. This forces the roller 38 upwardly and the cam members 39 downwardly and results in compressing the cushion member 30 against the pressure plate 28. This acts through the thrust bearing 27 to force the stationary plate 26 against the friction disc 25 and the latter against the brake disc 24 so that it is exceedingly difficult to rotate the shaft 17. This causes the wheels to rigidly maintain their straight ahead position to prevent any wobbling or "fishtailing" of the trailer.

However, should the tow car turn a corner, the roller 38 will roll from the high point of the cam track 41 to one of the low ends thereof, as shown in broken line in Fig. 5. This releases the pressure on the pressure plates and the friction on the friction disc 25 so that the trailer wheels may freely and easily follow the tow car around the turn. As soon as the turn has been completed, the roller 38 will again travel to the high point of the cam, placing a frictional resistance on the turning of the shaft 17 to maintain the caster wheels in the straight ahead position.

When the tow car is backed, the caster wheels will swing around to the opposite side of their shafts 17 carrying the roller 180° to the broken line position of Fig. 4 completely releasing the frictional resistance so that backing can be freely accomplished and manual manipulation may be freely accomplished.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A trailer dolly for use in attaching the front end of a trailer to a tow car comprising: a cross frame member; a vertical shaft rotatably mounted in each extremity of said frame member; caster wheels mounted on the lower extremity of each of said shafts so as to trail rearwardly when said trailer is towed straight ahead; a yoke pivoted intermediate its extremities on the upper extremity of each of said shafts so that when its one extremity is moved upward, its other extremity will move downward; a cam track positioned in the path of the one extremity of each of said yokes; a high point on said cam track over which the one extremity of said yoke will ride to tilt the other extremity of the latter downward when said caster wheels are in the rearwardly trailing position; and means operable in consequence of the downward tilt of the said other extremity of said yoke to exert a braking action on said vertical shaft.

2. A trailer dolly for use in attaching the front end of a trailer to a tow car comprising: a cross frame member; a vertical shaft rotatably mounted in each extremity of said frame member; caster wheels mounted on the lower extremity of each of said shafts so as to trail rearwardly when said trailer is towed straight ahead; a yoke pivoted intermediate its extremities on the upper extremity of each of said shafts so that when its one extremity is moved upward, its other extremity will move downward; a cam track positioned in the path of the one extremity of each of said yokes; a high point on said cam track over which the one extremity of said yoke will ride to tilt the other extremity of the latter downward when said caster wheels are in the rearwardly trailing position; means operable in consequence of the downward tilt of the said other extremity of said yoke to exert a braking action on said vertical shaft; and resilient means positioned between the said other extremity of said yoke and said means for exerting a braking action for cushioning the action of the former on the latter.

3. A trailer dolly for use in attaching the front end of a trailer to a tow car comprising: a cross frame member; a vertical shaft rotatably mounted in each extremity of said frame member; caster wheels mounted on the lower extremity of each of said shafts so as to trail rearwardly when said trailer is towed straight forward; a horizontally positioned brake disc concentrically affixed to each shaft; a stationary plate positioned above each brake disc and about said shaft; means for preventing horizontal rotation of said stationary plates, yet allowing vertical movement thereof; a yoke pivoted intermediate its extremities upon each shaft above said stationary plate, with its one extremity extending radially outward therefrom; a roller carried on the said one extremity of each of said yokes positioned to travel in a circumferential path; a cam track positioned in the path of each roller; a high point on each cam positioned ahead of said shaft so that said roller will be lifted when the wheels are in a rearward trailing position to tilt the other extremity of said yoke downward; and means communicating the downward movement of the said other extremity to said stationary plate to force said stationary plate toward said brake disc for resisting rotation of said shaft when said trailer is towed straight forward.

4. A caster wheel mounting for trailers comprising: a wheel bracket; a caster wheel mounted eccentrically on said bracket; a pivot shaft extending upwardly from said bracket; bearing devices for rotatably supporting said shaft in a vertical position; a brake disc mounted on said shaft; a stationary plate positioned above each brake disc; means for preventing horizontal rotation of said stationary plate, yet allowing vertical movement of said plate; friction means positioned between said disc and said plate; a tilting member pivotally mounted intermediate its extremities on said shaft to rotate therewith and project radially outward therefrom; means for communicating the vertical movements of one extremity of said tilting member to said stationary plate to cause the latter to approach said disc; and a stationary cam in the path of rotation of the other extremity of said tilting member for tilting the latter at a predetermined point in the rotation of said shaft to cause said stationary plate to exert a braking action on said brake disc.

5. A caster wheel mounting for trailers comprising: a wheel bracket; a caster wheel mounted eccentrically on said bracket; a pivot shaft extending upwardly from said bracket; bearing devices for rotatably supporting said shaft in a vertical position; a brake disc mounted on said shaft; a stationary plate positioned above said brake disc; means for preventing horizontal rotation of said stationary plate, yet allowing vertical movement thereof; a thrust bearing resting on said stationary plate about said shaft; a pressure plate resting on said bearing; a supporting lug fixed to the upper extremity of said shaft; a horizontal hinge pin carried by said lug to one side of said shaft; a bifurcated yoke tiltably mounted on said pin with its furcations extending to positions on opposite sides of said shaft, and with its joining portion projecting outward to one side of said shaft; a roller carried by said joining portion so as to travel in a circle about said shaft; a cam track maintained stationary in the circle of travel of said roller; a high point on said cam track over which said roller passes to depress the furcations of said yoke; and resilient means for communicating the downward movement of said furcations to said pressure plate to cause the latter to force the stationary plate toward said brake disc to exert a braking action on said shaft.

ERNEST C. McDANIEL.

REFERENCES CITED

The following references are of record in the file of this patent:

UNITED STATES PATENTS

| Number | Name | Date |
|---|---|---|
| 1,589,104 | Bull | June 15, 1926 |
| 2,192,282 | Warner | Mar. 5, 1940 |